Jan. 19, 1971
P. E. LENKER
3,555,904
FLUID QUANTITY INDICATING SYSTEM
Filed March 24, 1969
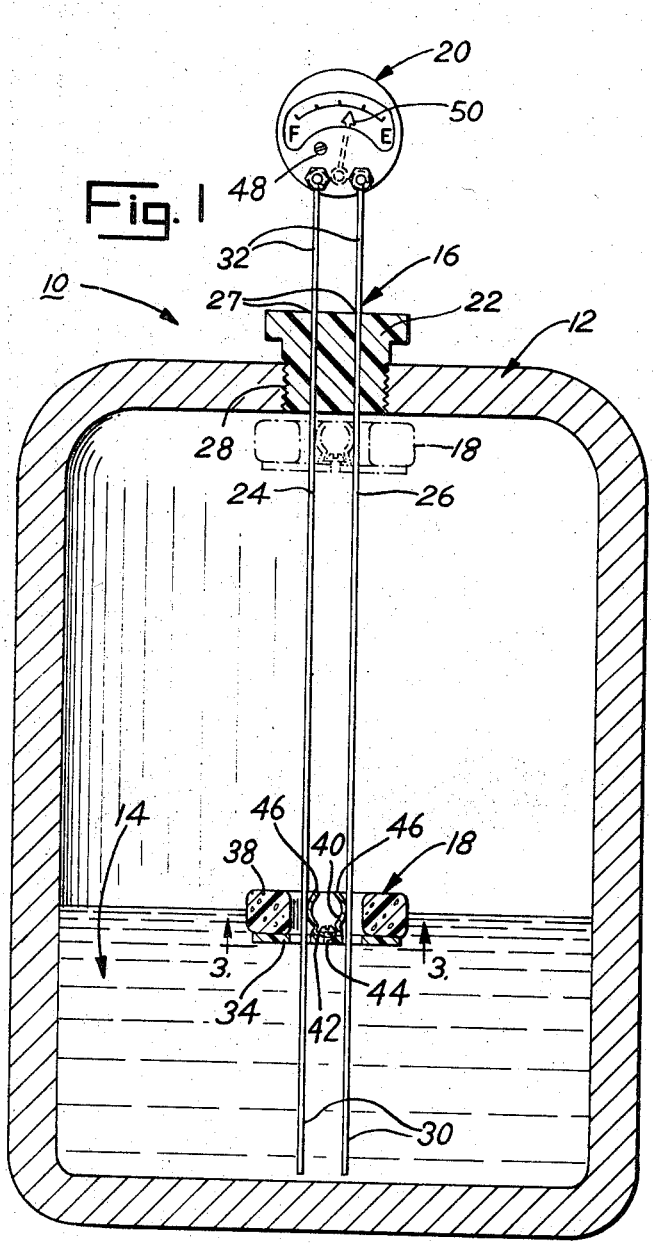
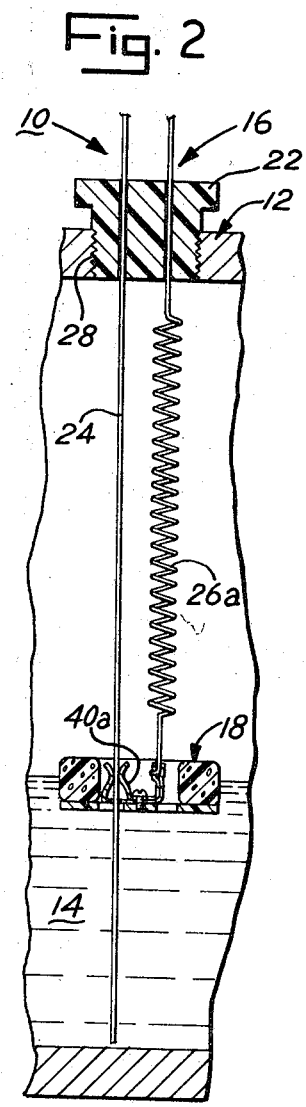
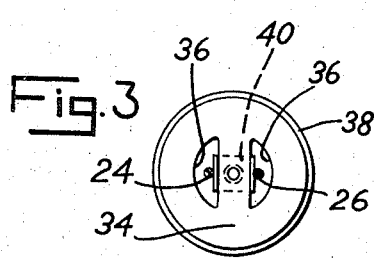
INVENTOR.
PAUL E. LENKER
BY
Plante, Arens, Hartz, Hix and Smith
ATTORNEYS 3,555,904
FLUID QUANTITY INDICATING SYSTEM
Paul E. Lenker, Davenport, Iowa, assignor to The Bendix Corporation, a corporation of Delaware
Filed Mar. 24, 1969, Ser. No. 809,782
Int. Cl. G01f 23/10
U.S. Cl. 73—313                    5 Claims

ABSTRACT OF THE DISCLOSURE

A fluid quantity indicating system having a vessel containing a known cryogenic fluid, a thermocouple suitably extending into said fluid in said vessel, an electrical measuring device connected to said thermocouple externally of said vessel, and a shorting device responsive to said fluid quantity to cause said electrical measuring device to indicate the quantity of fluid. The system provides, fluid quantity indications without the normal requirement for an external source of electrical power.

SUMMARY OF THE INVENTION

It is an object of this invention to provide an improved fluid quantity indicating system.

It is an object of this invention to provide an improved apparatus for the measurement and indication of the level of a cryogenic liquid contained within a vessel.

It is an object of this invention to provide an improved cryogenic fluid level indicating system wherein an external source of electrical power is not required.

Other objects and features of the invention will be apparent from the following description of the fluid quantity indicating system taken in connection with the accompanying drawings.

BRIEF DESCRIPTION OF THE DRAWINGS

FIG. 1 is a sectional view depicting the fluid characteristic indicating system of this invention;

FIG. 2 is a fragmented sectional view showing a modified form of the thermocouple means depicted in FIG. 1; and FIG. 3 is a sectional view taken along line 3—3 of FIG. 1.

DESCRIPTION OF THE PREFERRED EMBODIMENTS

Referring now to the drawing, and particularly FIG. 1, a fluid quantity indicating system is generally identified by the numeral 10. The fluid or liquid level indicating system 10 is comprised of a vessel 12 containing a cryogenic fluid 14, a thermocouple means 16, a shorting means 18, and an electrical measuring means 20.

Although the vessel 12 is shown as a generally cylindrical shaped closed container, other shapes or configurations may be used. As will be understood by those skilled in the art, the cryogenic liquid 14 may be any one of those known in the art. It is, however, necessary to have a predetermined temperature differential between the cryogenic fluid 14 and the exterior of the vessel 12 to facilitate operation of the thermocouple means 16, as will be explained more fully hereinafter.

The thermocouple means 16 is comprised of a nonconductive plug member 22 which carries and vertically positions rod-shaped thermocouple elements 24 and 26 in vertical bores 27. The plug member 22 is threadably engaged in bore 28 of vessel 12 so as to locate one end 30 of the thermocouple means 16 internally of the vessel 12 and extend it in the cryogenic liquid 14, while the other end 32 of the thermocouple means 16 extends externally of the vessel 12. Elements 24 and 26 are suitably mechanically and electrically connected at the end 32 to the electrical measuring means or current meter 20. Element 24 is made of a suitable metal, such as constantan, and exhibits resistance in the presence of an electrical current. Element 26 is made from a suitable metal, such as copper, and acts as a conductor in the presence of an electrical current. The dissimilarity of the constantan when compared to the copper, provides the requisite basis for the thermocouple action when a predetermined temperature differential exists between the ends 30 and 32 of the elements 24 and 26, and said elements are brought into contact by the shorting means 18.

Referring now specifically to FIGS. 1 and 3, the shorting means 18 is comprised of a disc-shaped plate 34 having openings 36, a circular floatation means 38 may be affixed to the plate 34 with an adhesive or by any other suitable technique. Further, the shorting element 40 includes a base portion 42 which is mounted in the center of plate 34 by means of a screw 44, and resilient leg portions 46, which are designed to exert a slight preload against the elements 24 and 26 when plate 34 is slidably installed on said thermocouple means 16 by insertion of said elements into the openings 36. As will be seen from the drawings, the floatation means 38 is responsive to the level of the liquid 14 and positions the shorting element 40 as a function of the liquid level.

Due to the inherent properties of the thermocouple means 16 in the presence of a predetermined temperature differential, the elements 24 and 26, being in contact with each other via the shorting element 40, will cause a voltage to be developed and thus a current to flow therebetween, and thus, through the current meter 20. Assuming the vessel 12 is filled with liquid 14, the floatation means 38 would then be positioned very near the top of the vessel 12, as shown by the dotted outline in FIG. 1.

With the floatation means 38 in this position, the current meter 20 can now be calibrated by means of turning adjustment screw 48 until pointer 50 is deflected to align with the letter F (which indicates that the vessel is full). As liquid 14 is removed from the vessel 12 by means of an outlet (not shown), the shorting element 40 will slide down the elements 24 and 26. Since the resistive properties of the constantan element 24 are linear over its entire axial length, the effective resistance in series with the source of voltage generated by the thermocouple means 16 increases, thereby causing a decrease in current flow passing through the current meter 20. As will be further understood by those skilled in the art, the selection of the current meter 20 and thermocouple means 16 is such that the pointer 50 aligns itself with the E of the meter when the floatation means 38 is resting near or on the bottom of the vessel 12, to thereby indicate that the vessel 12 is empty.

Although the elements 24 and 26 are shown as being comprised, respectively, of constantan and copper; it will be understood that the thermocouple means 16 may well be comprised of any combination of the other widely used thermocouple materials.

With reference now briefly to FIG. 2, it may be seen that a modified form of the thermocouple means 16, shown in FIG. 1, may be employed. More specifically, the element 26A is shown as a copper coil spring. The spring 26A is connected to be electrically conductive with a modified shorting element 40A. The shorting element 40A is slidably connected to element 24 to facilitate functional performance of said indicating system 10, as previously explained hereinabove.

While the specific details have been herein shown and described, the invention is not confined thereto, as other substitutions can be made within the spirit and scope of the invention.

I claim:
1. A system for measuring the quantity of fluid within a container comprising:
a vessel containing a cryogenic fluid;
said fluid and exterior of said vessel being at a predetermined temperature differential;
thermocouple means having one end thereof located internally of said vessel and extending into said cryogenic fluid, and the other end located externally of said vessel;
said thermocouple means comprising two elements, one of said elements being formed of electrical resistance material;
electrical measuring means connected between said elements on said other end of said thermocouple means; and
shorting means slidably interposed between said elements on said one end of said thermocouple means;
said shorting means being responsive to said quantity of fluid to position itself along said one element to thereby change the effective electrical resistance in series with said electrical measuring means;
said electrical measuring means being responsive to the position of said shorting means to indicate said quantity of fluid.

2. A liquid level indicating system comprising:
a vessel containing a cryogenic liquid;
said liquid and the exterior of said vessel being at a predetermined temperature differential;
thermocouple means having one end thereof located internally of said vessel and extending into said cryogenic liquid, and the other end thereof located externally of said vessel;
said thermocouple means comprising two elements, one of said elements being formed of electrical resistance material;
electrical measuring means connected between said elements on said other end of said thermocouple means; and
shorting means slidably interposed between said elements on said one end of said thermocouple means;
said shorting means including floatation means which is supported by said liquid;
said floatation means being responsive to said liquid level so as to position said shorting means along said one element to thereby change the effective electrical resistance in series with said electrical measuring means;
said electrical measuring means being responsive to the position of said shorting means to indicate the level of said liquid.

3. A thermocouple means, as recited in claim 2, wherein one of said elements is comprised of constantan and the other of said elements is comprised of copper.

4. A thermocouple means, as recited in claim 2, wherein said elements are rod-shaped.

5. A thermocouple means, as recited in claim 2, wherein one of said elements is rod-shaped and the other of said elements is a flexible conductor.

References Cited

UNITED STATES PATENTS

| | | | |
|---|---|---|---|
| 3,369,401 | 2/1968 | Briggs et al. | 73—304 |
| 3,465,315 | 9/1969 | Alexander et al. | 73—359X |

S. CLEMENT SWISHER, Primary Examiner

FREDERICK SHOON, Assistant Examiner